March 21, 1950     I. KORN     2,501,569
ELECTRIC CONNECTION DEVICE

Filed April 23, 1948     2 Sheets-Sheet 1

INVENTOR
ISIDORE KORN
ATTORNEY

March 21, 1950  I. KORN  2,501,569
ELECTRIC CONNECTION DEVICE
Filed April 23, 1948  2 Sheets-Sheet 2
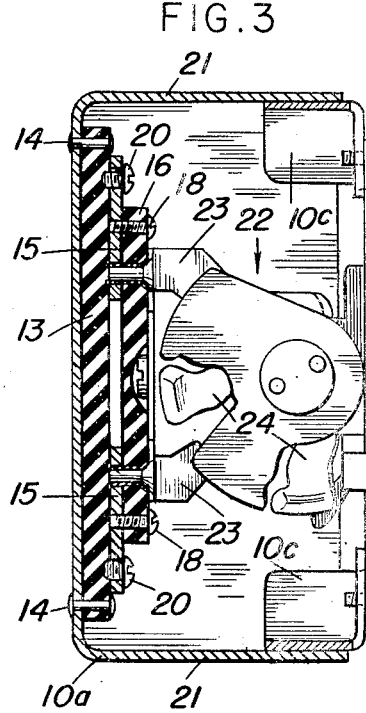
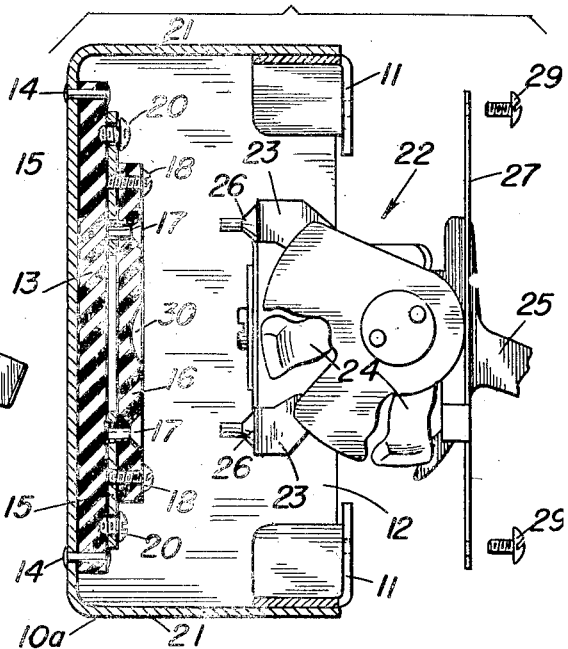
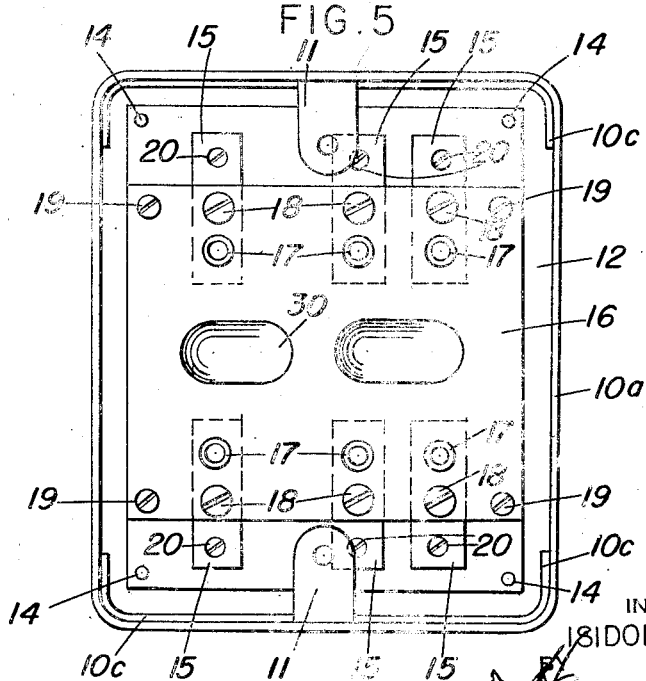
INVENTOR
ISIDORE KORN
ATTORNEY Patented Mar. 21, 1950

2,501,569

UNITED STATES PATENT OFFICE 2,501,569

ELECTRIC CONNECTION DEVICE

Isidore Korn, Newark, N. J.

Application April 23, 1948, Serial No. 22,802

1 Claim. (Cl. 174—53)

This invention relates to electric switches, receptacles, and similar connection devices for electric wiring installations.

Certain types of conventional devices of this character, including those intended for heavy duty industrial wiring installations, as well as those for domestic systems, comprise switch, outlet, or other electrical connection units mounted in supporting framework or enclosing casings or boxes into which lead power supply and power delivery conductors, such as cables or conduits. Electrical connection of such units with the electrical conductors is made within the supporting framework or enclosing casings or boxes. Ordinarily, when it is desired to remove the connection unit therefrom for repair or replacement, or merely for inspection, the electrical power leads must be disconnected and then reconnected at no little difficulty and inconvenience.

Pursuant to the present invention, the supporting framework, casing, or box is so constructed that the connection unit per se may be quickly, easily and safely removed and replaced, breaking and re-making electrical connection with the power conductors, without even the necessity of shutting off the electric power flowing through the system.

Accordingly, it is an object of the invention to provide an electric connection device wherein the connection unit may be removed from the support wherein electrical connection is made, e. g. framework, casing, box, base, or the like, for inspection, repair, or replacement, and wherein that or a substitute unit may be replaced quickly, easily, and safely without shutting off the power supply.

A further object is to provide for the above by a construction which is simple and economical to manufacture and which differs very little from conventional constructions.

These and other objects and features of the invention will be fully explained in the following detailed description of the preferred specific embodiments illustrated in the accompanying drawings, wherein:

Fig. 3 is a vertical section taken on the line 3—3, Fig. 2;

Fig. 4 is a view similar to that of Fig. 3 but illustrating how the switch unit may be withdrawn from and replaced within the switch box;

Fig. 5 is a front elevation of the device as it appears with switch box cover and switch unit removed;

Figure 1:
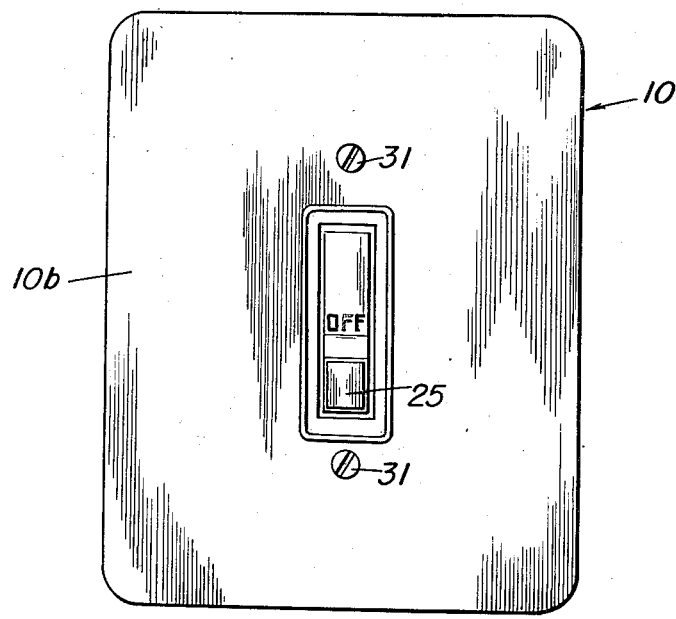
Fig. 1 is a front elevation of an industrial type of swtich embodying the invention.

Referring now to the drawings:

The form of the invention illustrated in Figs. 1 through 5 is an industrial type, comprising a switch box or casing 10, made up of a deep box body 10a and a relatively shallow close-fitting cover 10b. This switch box is of conventional construction, usually being fabricated of sheet steel and provided with the customary weakened knock-out areas in the side walls of the box body for the introduction of electric power cables or conduits at optional locations. While the component parts of such switch box are, as ordinarily made, sheet steel stampings bent to shape where necessary, they may be formed of other materials, for example of one of the well known plastics, such as Bakelite, in a manner suitable to the particular material employed. In the illustrated instance end pieces 10c, 10c are welded to the inner upper margins of the end walls of the box body 10a, so they extend upwardly beyond said end walls and provide a neck for the close-fitting accommodation of the cover 10b. Centrally thereof they have inwardly projecting ears 11, 11, which serve to receive and support the switch unit.

The switch unit is for the most part conventional in construction, and may be of any desired type consistent with those particular structural features necessary to effect the purposes of the invention, which features are detailed herebelow in association with the correlative features of the cooperating power-connection assembly.

The various parts of the switch unit should be so integrated with one another that the combination forms an assembly independent of the other portions of the device and separable therefrom as a single entity. It is provided with electric terminals for close frictional contact with corresponding electric terminals of the power-connection assembly, from whence comes the electric power flowing to the switch contacts and through said contacts when the switch is closed.

The power-connection assembly is anchored within the box body to the base thereof, and, when the switch box is installed ready for use, is in constant electrical connection with the power supply. That connection need never be broken, nor need the electric power supply be shut off when removing or replacing the switch unit, because the electrical connection between switch unit and power-connection assembly is broken automatically and at a location remote from those parts of the switch unit subject to handling during the removing or replacing process.

In the illustrated embodiment, the power-connection assembly is disposed at the bottom or base of the box body 10a, which lies opposite the opening 12 leading thereinto, and is adapted to be normally closed by the removable cover 10b, Fig. 1. It comprises an insulating base plate 13 anchored to the bottom of the box body, as, for instance, by means of the rivets 14. Such base plate may be of any rigid insulating material, for instance hard rubber or a suitable plastic, and forms a bed for the desired number of electrical terminal strips 15, here shown as three at each of the opposite ends of the plate, see especially Fig. 5. An insulating top plate 16, similar in nature to the base plate 13 but shorter so as to leave end portions of the electrical terminal strips 15 exposed, is superimposed upon the base plate 13 and upon portions of the said terminal strips. Such terminal strips are preferably fastened to the underside of the top plate 16 by means of electrically conductive funnel-shaped grommets 17, which serve as plug-in sockets, and also by means of screws 18. The top plate 16 is secured to the bottom plate 13 by means of screws 19, thereby providing a unitary power connection assembly which is secured within the box body 10a in predetermined and unchanging position. Binding-post terminals 20, disposed in the uncovered ends of the respective electrical terminal strips 15, stand ready for electrical connection with the conductors of any electric power supply cable or conduit and corresponding power delivery cable or conduit which may be introduced through the respective access passages formed by breaking out the conventional weakened disc or knock-out portions 21 at either end of the casing body.

The switch unit, designated generally 22, is designed to provide, when closed, an electrical bridge between those electrical terminal strips 15 at one end of the casing and the respectively corresponding terminal strips 15 at the opposite end of the casing, thereby closing the circuit between power supply and power delivery. Accordingly, it possesses opposite sets of stationary electrical contacts 23, and movable electrical conductors 24 capable of establishing electrical connection between corresponding contacts of the said sets of stationary contacts when the switch lever or toggle 25 is snapped from "off" to "on" position in well known manner. Since the switch unit illustrated is conventional so far as its operative mechanism is concerned, further description of such mechanism is not necessary here. What is important is the manner in which the unit fits into the casing and makes easily separable electrical connection with the power connection assembly.

As illustrated, each of the stationary electrical contacts 23 is formed with an externally funnel-shaped, preferably solid, conductive foot 26 projecting outwardly therefrom as a male plug-in terminal for close mechanical and electrical engagement with a corresponding one of the internally funnel-shaped grommets 17 of the power connection assembly. A spider plate 27, secured to the body of the switch unit by means of the screws 28, Fig. 2, is adapted to be secured to the inturned ears 11 of the box body 10a by means of screws 29, see especially Figs. 3 and 4, whereby the switch unit 22 as a whole is removably fastened within the box body.

As shown in Fig. 4, the switch unit may be quickly and easily removed for inspection or repair by merely unscrewing the screws 29 and pulling the entire unit outwardly of the mouth 12 of the box. It may be as quickly and easily replaced by merely pushing it into position within the box body, the plug-in feet 26 sliding into tight engagement with their respectively corresponding socket terminals 17, see Fig. 3. The upper surface of the top insulating plate 16 may be recessed slightly, as shown at 30, to accommodate projecting parts of the switch unit.

Figure 2:
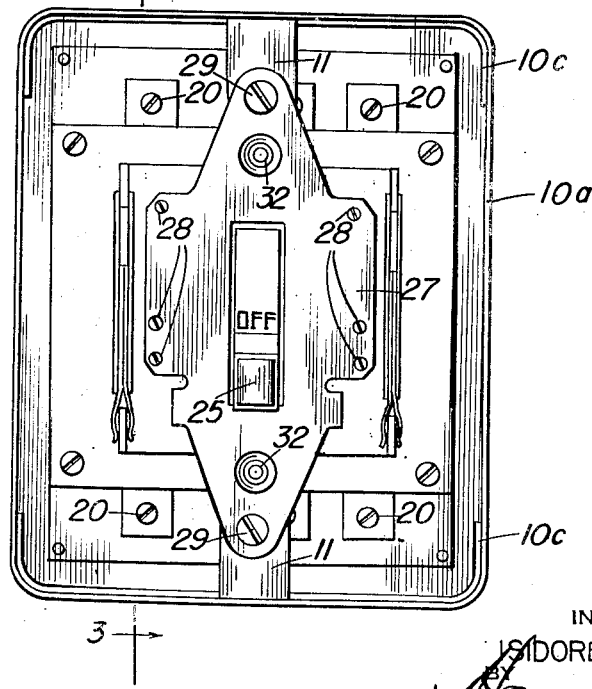
Fig. 2 is a similar view with the cover of the switch box removed.

The removable cover 10b of the switch box fits snugly over the upstanding neck portion 10c of the box body, and is secured in place by screws 31, Fig. 1, which thread into receiving openings 32, Fig. 2, of spider plate 27 and are easily unscrewed when it is desired to remove the switch unit 22 from the box, as hereinbefore described.

The switch lever 25 extends through suitably provided apertures in both the spider plate 27 and cover 10, so as to be available outside the box for manually actuating the switch from "off" to "on" positions and vice versa.

The above embodiments well exemplify the generic aspects of the invention, and are clearly indicative of how those skilled in the art can apply the principles of the invention to other similar connection devices, such as receptacles or convenience outlets. In the latter instance the switch unit would be replaced by a socket or plug-in type of connection unit, the framework and actual power connection elements being arranged to suit the particular connection unit employed, it being kept in mind that the base supporting the power connection, and the connection unit separably mated therewith, are the prime elements concerned.

Whereas this invention is here illustrated and described with respect to certain preferred forms thereof, it should be understood that the inventive concepts defined by the following claims may be embodied in other forms by those skilled in the art without departing from the generic teaching or scope of the invention.

I claim:

An electric switch box, comprising a separable casing having a shallow cover part and a relatively deep body part; an electric power connection assembly secured within said body part of the casing substantially at the bottom thereof, said assembly comprising an insulating base plate, an insulating top plate, and spaced, oppositely disposed sets of spaced electrical terminal strips sandwiched between the said base and top plates at opposite ends thereof, means for electrically connecting the outer ends of said terminal strips at one end of the said assembly to respective electric power supply conductors, means for electrically connecting the outer ends of said terminal strips at the opposite end of said assembly to respective electric power delivery conductors, electrical terminal contacts at the respective inner ends of all of said terminal strips and exposed for interconnection with corresponding electrical contacts of a removable switch unit; said electrical terminal contacts comprising funnel-shaped grommets which extend through the said top plate and secure the respective electrical terminal strips thereto; an electric switch unit adapted to be removably disposed within said casing, and having a set of electrical terminal contacts exposed for interconnection with the said terminal contacts of the power connection assembly, said terminal contacts of the switch unit comprising plug-in members which mate with said terminal contacts of the power connection assembly when the switch unit is in place within said casing.

ISIDORE KORN.

REFERENCES CITED

The following references are of record in the file of this patent:

UNITED STATES PATENTS

| Number | Name | Date |
| --- | --- | --- |
| 1,938,309 | Williams | Dec. 5, 1933 |
| 2,351,632 | O'Brien | June 20, 1944 |
| 2,397,688 | Osinski | Apr. 2, 1946 |